Figure 1:
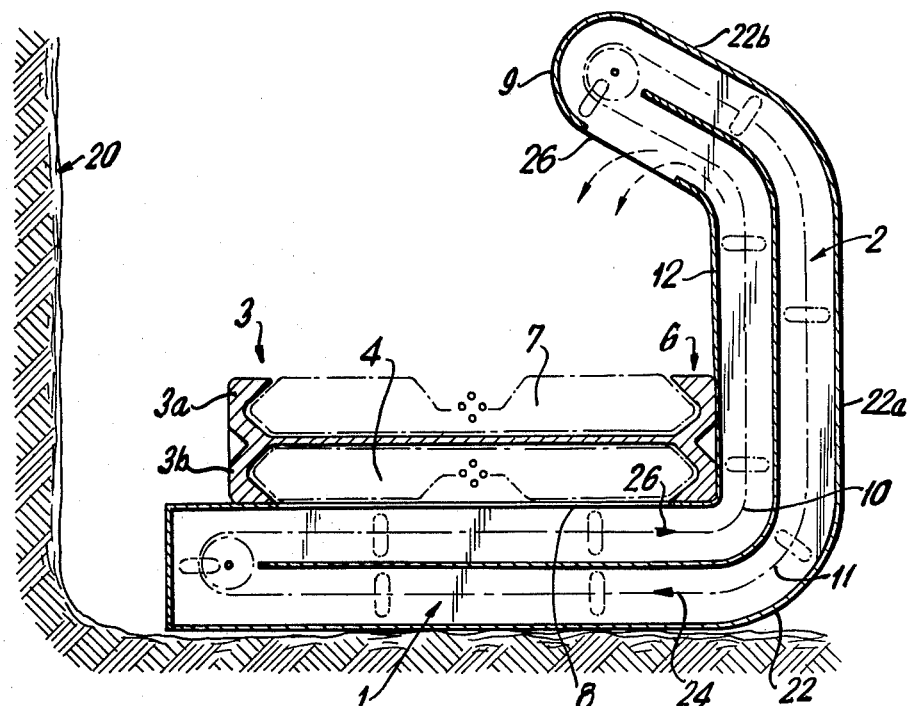

United States Patent [19]

Braun et al.

[11] 4,094,400
[45] June 13, 1978

[54] CONVEYOR FOR CONVEYING FINE MATERIAL

[75] Inventors: Ernst Braun; Gert Braun, both of Essen-Heisingen, Germany

[73] Assignee: Halbach & Braun, Germany

[21] Appl. No.: 727,250

[22] Filed: Sep. 27, 1976

[30] Foreign Application Priority Data

Oct. 2, 1975 Germany .............................. 2543987

[51] Int. Cl.² ...................... B65G 19/08; B65G 19/14
[52] U.S. Cl. .................................. 198/607; 198/580; 198/720
[58] Field of Search ............... 198/494, 498, 537, 580, 198/607, 716, 720, 728, 733, 602, 606, 735

[56] References Cited

U.S. PATENT DOCUMENTS

| | | | |
|---|---|---|---|
| 2,403,024 | 7/1946 | Rixon | 198/716 |
| 3,522,875 | 8/1970 | Smerd et al. | 198/728 |
| 3,809,211 | 5/1974 | Padilla | 198/537 X |
| 3,954,168 | 5/1976 | Braun et al. | 198/733 |

FOREIGN PATENT DOCUMENTS

| | | | |
|---|---|---|---|
| 428,056 | 4/1935 | United Kingdom | 198/607 |
| 460,322 | 1/1937 | United Kingdom | 198/494 |

*Primary Examiner*—Robert W. Saifer
*Assistant Examiner*—James L. Rowland
*Attorney, Agent, or Firm*—McGlew and Tuttle

[57] ABSTRACT

A conveyor for conveying fine materials, particularly of fine coals in underground operations, comprises a first conveyor unit which includes a horizontal section which is movable in a transport direction through a path intercepting a chain scraper conveyor which includes a lower section which moves over the horizontal section of the first conveyor unit and delivers the fines thereto which are moved to a vertical section of the first conveyor unit. The vertical section moves upwardly with the fine materials and discharges the materials downwardly on to the upper section of the chain scraper conveyor. The first conveyor unit includes a housing which forms a support for the chain scraper conveyors, and it is provided with an opening overlying the horizontal section so that the lower section of the chain scraper conveyor may deposit the fine materials moved thereby into the horizontal conveyor.

6 Claims, 2 Drawing Figures

U.S. Patent June 13, 1978 4,094,400

CONVEYOR FOR CONVEYING FINE MATERIAL

BACKGROUND OF THE INVENTION

1. Field of the Invention

This invention relates, in general, to the construction of conveyors and, in particular, to a new and useful conveyor construction for conveying fine materials which includes a chain conveyor which is mounted on a housing of a conveyor unit which includes a horizontal portion which traverses a lower section of the chain scraper conveyor and receives the material therefrom and delivers it upwardly to a vertical portion which discharges it downwardly onto the upper section of the chain scraper conveyor.

2. Description of the Prior Art

A constant problem in the transport of materials which include fines is that at the point of reversal of the respective conveyors in the course of material transfer, a portion of the fines is entrained into the lower section and is partly taken along to the other point of reversal. This involves considerable drive losses and, hence, energy losses, especially in the case of a chain scraper conveyor, which are arranged in underground locations because, such chain scraper conveyors have a considerable tendency to entrain fine coal in the lower section.

SUMMARY OF THE INVENTION

The present invention provides an arrangement of conveyors in which the tendency for fine coal to become entrained in the sections is overcome. The present invention provides a fines conveyor for belt conveyors and, more particularly, a fine coal conveyor for chain scraper conveyors in underground operations which insures satisfactory hauling away of the fines or the fine coal in the lower section of the fines conveyor or chain scraper conveyor. To solve this problem, the fines conveyor and, more particularly, the fine coal conveyor is characterized by a unit which consists of a horizontal conveyor and a vertical conveyor. The horizontal conveyor traverses the lower section of a chain scraper conveyor in the zone of the reversal end of this conveyor, and it extends substantially at right angles to the transport direction thereof. The vertical conveyor receives coal moved by the horizontal conveyor and delivers it up and over onto the upper section of the chain scraper conveyor.

The construction of the invention results in a horizontal conveyor and vertical conveyor for the continuous hauling of fine coal out of the lower section of a chain scraper conveyor in the zone of the reversal end of the chain scraper conveyor so that an entrainment of the fine coal which has gotten into the lower section is avoided with certainty. Always that portion of the fine coal which gets into the lower section is delivered to the horizontal conveyor and is returned from the horizontal conveyor continuously near the vertical conveyor portion which delivers it back onto the upper section of the chain scraper conveyor.

The transport cycle of an endless chain conveyor system for fine coal is closed, but it must be noted that always only a residual portion of the fine coal transported by the horizontal and vertical conveyors into the upper section of the chain scraper conveyor gets back into the lower section of the chain scraper conveyor. A greater portion is discharged in the zone of the reversal end of the chain scraper conveyor. In this way, the lower section of the chain scraper conveyor behind the horizontal conveyor, remains free of fine coal so that practically no drive and energy losses occur. The energy required to drive the horizontal and vertical conveyors is minimal in comparison with this saving.

Advantageously, the chain scraper conveyor is mounted in the zone of the horizontal conveyor on the trough thereof so as to insure satisfactory transfer of the fine coal in the lower section of the chain scraper conveyor to the horizontal conveyor or to the upper section thereof. Further, the invention provides that on the gob side, the vertical conveyor connects with the horizontal conveyor as an L- or C-shaped leg and has a reversal end present above the chain scraper conveyor. Thereby, satisfactory transfer of the fine coal from the vertical conveyor into the upper section of the chain scraper conveyor is insured. If, on the gob side, the chain scraper conveyor presents a "Bracken" profile, it is provided according to a preferred form of the invention with independent significance that the vertical conveyor is integrated into the "Bracken" profile as a component part thereof or is, itself, installed as a "Bracken" profile.

According to the teaching of the invention, therefore, the vertical conveyor with the "Bracken" profile forms a closed wall against which the won coal stands or applies. Expediently, the horizontal conveyor and the vertical conveyor are also designed as chain scraper conveyors. Since they form one unit, they possess a trough plate which passes over one into the other and also through side walls passing over one into the other. Surprisingly, the mere design as a chain scraper conveyor suffices to obtain a satisfactory raising of the fine coal in the vertical conveyor and its delivery to the chain scraper conveyor. This effect can be improved, however, by the vertical conveyor being provided with a closed upper section. Also, a covering of the lower section for the returning chain reach is conceivable.

The advantages achieved by the invention must be seen essentially in that a fine coal conveyor for chain scraper conveyors in underground operations is realized which provides, in a simple manner, for the hauling out of the fine coal otherwise entrained in the lower section of the chain scraper conveyor, and it returns this coal to the upper section of the chain scraper conveyor. Thereby, considerable drive or energy losses for the drive of the chain scraper conveyor are avoided. The teaching of the invention can be realized to advantage where there is a danger, generally, that fines are entrained into the lower section of a conveyor and at a location onward from there, that is, very generally in fines conveyors, belt conveyors, or similar conveyors. Absence of fines from the lower section of the main conveyor is always provided for.

Accordingly, it is an object of the invention to provide a fines conveyor for conveying fine materials, particularly a fine coal which includes a first conveyor unit which has a horizontal section in a position to receive materials transported by a second conveyor in a lower section thereof and to deliver it to a vertical conveyor which is arranged alongside one end of the horizontal conveyor in a position in which the upper end thereof overlies an upper section of the second conveyor so that the fine coal is returned thereto.

A further object of the invention is to provide a combined conveyor construction which is simple in design, rugged in construction and economical to manufacture.

The various features of novelty which charactize the invention are pointed out with particularity in the claims annexed to and forming a part of this disclosure. For a better understanding of the invention, its operating advantages and specific objects attained by its uses, reference should be had to the accompanying drawing and descriptive matter in which there is illustrated a preferred embodiment of the invention.

In the Drawings

Figure 2:
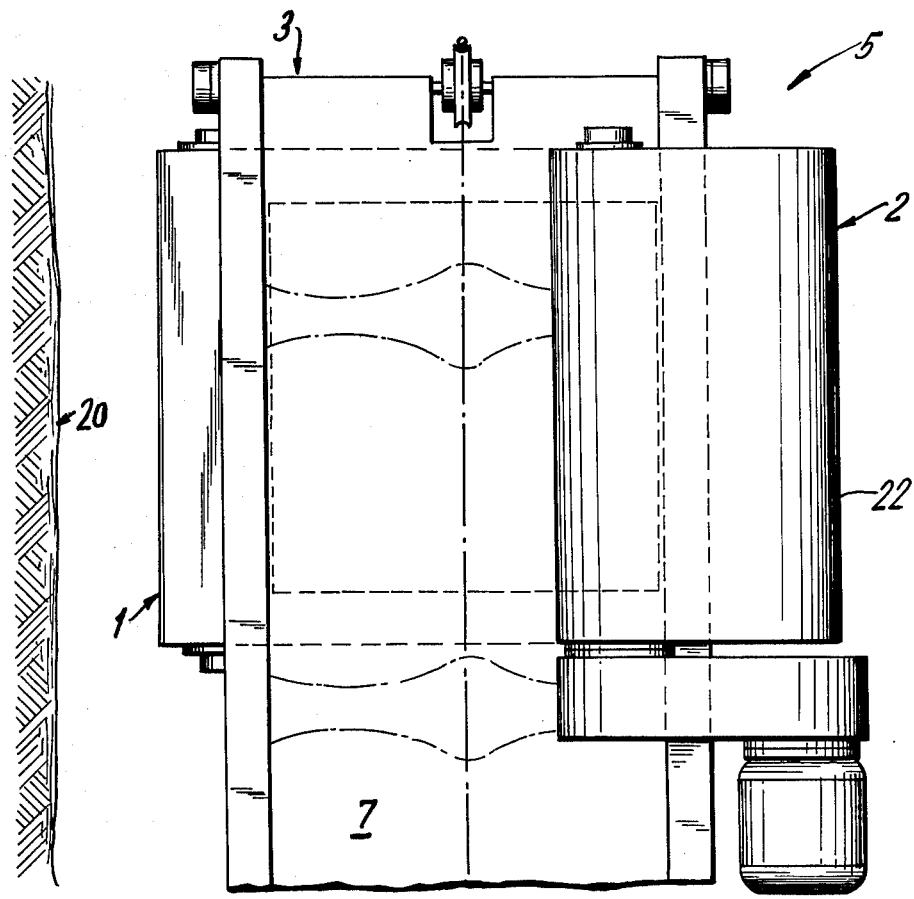

FIG. 1 is a partial sectional and partial elevational view of a combined conveyor construction constructed in accordance with the invention; and FIG. 2 is a top plan view of the combined conveyor shown in FIG. 1.

GENERAL DESCRIPTION OF THE PREFERRED EMBODIMENT

Referring to the drawings, in particular, the invention embodied therein comprises a combined conveyor for conveying fine materials, such as fine coal, in an underground location within a mine generally designated 20 and which includes a first conveyor unit which comprises a horizontal fines conveyor 1 which is arranged to advance materials within a closed housing 22 in a transport direction, as indicated by arrows 24 and 26. The fine materials are directed to one end of the horizontal section which includes a vertically extending housing portion 22a having a vertical conveyor 2 movable therein for moving the fines which are received upwardly through a path which extends through an obliquely extending housing portion 22b having a discharge opening 26 through which the fine materials are dumped onto an upper section 7 with a second conveyor unit or chain scraper conveyor generally designated 3. The horizontal section 1 of the first conveyor unit traverses a lower section 4 of the second conveyor unit 3 in the area of its reversal end 5 and it extends substantially at right angles to the transport direction along the second conveyor 3. The second conveyor 3 is advantageously provided with upper and lower trough portions 3a and 3b which are supported on the housing 22 so that a discharge opening 8 is left below the lower section 4 of the second conveyor unit 3.

On the gob side, the vertical conveyor 2 connects with the horizontal conveyor 1 as an L- or C-shaped leg and the upper conveyor 2 has a reversal end 9 which is located above the second conveyor unit 3. If the second conveyor 3 is designed as a gob side "Bracken" profile, the vertical conveyor 2 is integrated into the "Bracken" profile 12 as a component part of the "Bracken" profile, or it is itself installed as a "Bracken" profile. In the embodiment illustrated, the horizontal and vertical conveyors 1 and 2 are also chain scraper conveyors. Preferably, the vertical conveyor 2 possesses a closed upper section 10 and, in some cases, also a section 11 is also a closed section.

While a specific embodiment of the invention has been shown and described in detail to illustrate the application of the principles of the invention, it will be understood that the invention may be embodied otherwise without departing from such principles.

What is claimed is:

1. A conveyor for conveying fine materials, particularly a fine coal conveyor for underground operations, comprising a first conveyor unit comprising a substantially C-shaped housing with a bottom horizontal leg, a vertical leg connecting one end of said horizontal leg and an upper leg extending backwardly from said vertical leg over said horizontal leg, a horizontal section in said housing horizontally movable in a transport direction and a vertical section in said housing vertical leg connected to the opposite end of the horizontal section from the beginning of the transport direction in a position to direct the fine materials received from the horizontal section vertically upwardly, and an upper section extending backwardly from said vertical section over said horizontal section, a second conveyor unit mounted on the horizontal housing leg and located adjacent said first conveyor unit including upper and lower superposed troughs having respective upper and lower conveyor sections running in respective upper and lower troughs, said horizontal section of said first conveyor unit having a reversal end and being disposed to traverse at least a portion of said lower section of said second conveyor in the vicinity of said reversal end and substantially at right angles to the direction of transport on said horizontal section, said horizontal section receiving the fine materials from the lower section and delivering the fine materials to the vertical section for movement thereon, said vertical section having a discharge directed to said upper section.

2. A conveyor according to claim 1, wherein said horizontal and first sections of said second conveyor are chain scraper conveyors.

3. A conveyor according to claim 1, wherein said vertical conveyor includes a transport and a return section, at least one of said sections being closed by said housing.

4. A conveyor according to claim 1, wherein each of said conveyors comprises a chain scraper conveyor, said first conveyor horizontal and vertical sections including closed top and bottom portions with a reversal pulley at the end of said horizontal section opposite to said vertical section and with the reversal pulley of said vertical section being located adjacent the top end thereof.

5. A conveyor according to claim 1, wherein said upper section extends obliquely upwardly over said upper trough of said second conveyor, said housing having an opening therein and defining a discharge in said upwardly extending portion.

6. A conveyor according to claim 1, wherein said C-shaped housing of said first conveyor has an opening below said lower section of said second conveyor, said second conveyor being directly supported on said first conveyor housing on the horizontal leg directly adjacent said vertical leg.

* * * * *